United States Patent
Riku et al.

(10) Patent No.: US 9,661,969 B2
(45) Date of Patent: May 30, 2017

(54) CYCLONE SEPARATION DEVICE AND ELECTRIC VACUUM CLEANER WITH SAME

(71) Applicant: Mitsubishi Electric Corporation, Tokyo (JP)

(72) Inventors: Marika Riku, Tokyo (JP); Tsuyoshi Maeda, Tokyo (JP); Sota Komae, Tokyo (JP); Daisuke Kondo, Saitama (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/418,689

(22) PCT Filed: Jun. 7, 2013

(86) PCT No.: PCT/JP2013/065874
§ 371 (c)(1),
(2) Date: Jan. 30, 2015

(87) PCT Pub. No.: WO2014/027498
PCT Pub. Date: Feb. 20, 2014

(65) Prior Publication Data
US 2015/0289737 A1 Oct. 15, 2015

(30) Foreign Application Priority Data
Aug. 15, 2012 (JP) .................................. 2012-180175

(51) Int. Cl.
*A47L 9/16* (2006.01)
*B04C 3/06* (2006.01)
(Continued)

(52) U.S. Cl.
CPC .................. *A47L 9/165* (2013.01); *A47L 9/16* (2013.01); *A47L 9/1683* (2013.01); *B01D 45/12* (2013.01);
(Continued)

(58) Field of Classification Search
CPC B01D 45/12; B01D 45/16; A47L 9/16; A47L 9/165; A47L 9/1683; B04C 3/06; B04C 5/185
(Continued)

(56) References Cited

U.S. PATENT DOCUMENTS

| 5,062,870 A | 11/1991 | Dyson |
| 5,078,761 A | 1/1992 | Dyson |

(Continued)

FOREIGN PATENT DOCUMENTS

| CN | 104135905 A | 11/2014 |
| JP | H05-176871 A | 7/1993 |

(Continued)

OTHER PUBLICATIONS

International Preliminary Report on Patentability mailed Feb. 26, 2015 for the corresponding international application No. PCT/JP2013/065874 (and English translation).

(Continued)

*Primary Examiner* — Jason M Greene
(74) *Attorney, Agent, or Firm* — Posz Law Group, PLC

(57) ABSTRACT

A cyclone separation device includes: a swirl chamber that swirls air containing dust along a side wall therein, and separates dust from the air containing dust; a first dust collection chamber that communicates with an inside of the swirl chamber through a first opening formed in the side wall of the swirl chamber; a second dust collection chamber that communicates with the inside of the swirl chamber through a second opening formed on a downstream side of the first (Continued)

opening in the swirl chamber; a discharge pipe that communicates with a discharge port for discharging air in the swirl chamber; and a plurality of inlets that are provided on an upstream side of the first opening, and through which the air containing dust flows into the swirl chamber.

9 Claims, 10 Drawing Sheets

(51) Int. Cl.
    *B01D 45/12*     (2006.01)
    *B01D 45/16*     (2006.01)
    *B04C 5/185*     (2006.01)

(52) U.S. Cl.
    CPC ............. *B01D 45/16* (2013.01); *B04C 3/06* (2013.01); *B04C 5/185* (2013.01)

(58) Field of Classification Search
    USPC ................... 55/418, 428, 429, 447, 459.1
    See application file for complete search history.

(56) References Cited

U.S. PATENT DOCUMENTS

| | | | | |
|---|---|---|---|---|
| 6,896,720 | B1 * | 5/2005 | Arnold | B01D 45/16 55/459.1 |
| 7,047,593 | B2 * | 5/2006 | Kitamura | A47L 9/165 55/429 |
| 2002/0088209 | A1 * | 7/2002 | Stephens | A47L 9/165 55/337 |
| 2006/0090428 | A1 * | 5/2006 | Park | A47L 9/1625 55/428 |
| 2007/0214756 | A1 * | 9/2007 | Lee | B01D 45/12 55/419 |
| 2007/0289264 | A1 * | 12/2007 | Oh | A47L 9/1683 55/318 |
| 2009/0293224 | A1 | 12/2009 | Hyun et al. | |
| 2010/0218338 | A1 | 9/2010 | McLeod | |
| 2012/0311884 | A1 * | 12/2012 | Eisinger | B01D 45/12 34/427 |
| 2013/0025086 | A1 | 1/2013 | Komae et al. | |
| 2015/0026919 | A1 | 1/2015 | Maeda et al. | |

FOREIGN PATENT DOCUMENTS

| | | | | |
|---|---|---|---|---|
| JP | 11-146850 | * | 6/1999 | ............... A47L 9/16 |
| JP | H11-146850 | A | 6/1999 | |
| JP | 2004-329600 | * | 11/2004 | ............... A47L 9/16 |
| JP | 2004-329600 | A | 11/2004 | |
| JP | 2005-046417 | A | 2/2005 | |
| JP | 2009-055980 | A | 3/2009 | |
| JP | 2010-201167 | A | 9/2010 | |
| JP | 2011-160828 | A | 8/2011 | |
| JP | 2011-212171 | * | 10/2011 | ............... A47L 9/16 |
| JP | 2011-212171 | A | 10/2011 | |
| WO | 2008/114968 | A1 | 9/2008 | |
| WO | 2010/097612 | A1 | 9/2010 | |
| WO | 2011/122565 | A1 | 10/2011 | |

OTHER PUBLICATIONS

International Search Report of the International Searching Authority mailed Sep. 10, 2013 for the corresponding international application No. PCT/JP2013/065874 (and English translation).
Office Action issued May 12, 2016 in corresponding NZ patent application No. 704318.
Office Action dated Feb. 1, 2016 issued in corresponding CN patent application No. 201380043027.2 (and English translation).
Office Action mailed Mar. 15, 2016 issued in corresponding JP patent application No. 2014-530488 (and English translation).
Extended European Search Report dated Mar. 15, 2016 issued in corresponding EP patent application No. 13879616.4.
Office Action issued Mar. 28, 2016 in the corresponding TW application No. 102124655 (with partial English translation).
Office Action issued Oct. 11, 2016 in corresponding CN patent application No. 201380043027.2 (with partial English translation).
Office Action issued Jan. 6, 2017 in corresponding TW patent application No. 102124655 (with partial English translation).
Office Action dated Mar. 14, 2017 issued in the corresponding Japanese Patent Application No. 2016-118893 (and partial English translation).
Office Action dated Mar. 24, 2017 issued in corresponding CN Patent Application No. 201380043027.2 (and partial English translation).

* cited by examiner

CYCLONE SEPARATION DEVICE AND ELECTRIC VACUUM CLEANER WITH SAME

CROSS REFERENCE TO RELATED APPLICATIONS

This application is a U.S. national stage application of International Application No. PCT/JP2013/065874 filed on Jun. 7, 2013, and is based on Japanese Patent Application No. 2012-180175 filed on Aug. 15, 2012, the disclosures of which are incorporated by reference.

TECHNICAL FIELD

The present invention relates to a cyclone separation device and an electric vacuum cleaner with the same.

BACKGROUND ART

In a conventional cyclone separation device and an electric vacuum cleaner with the same, sucked air containing dust is swirled in a cylindrical separation chamber, and relatively large dust in the air containing dust is first separated by a centrifugal force and collected in a dust collection chamber below the separation chamber. On that basis, a device in which air is swirled in a separation portion with a higher centrifugal force, and relatively small dust is separated and collected in a dust collection chamber below the separation portion (for example, see Patent Literature 1), or a device in which air is filtered by a filter or the like, and relatively small dust is separated and collected in a dust collection chamber below the filter (for example, see Patent Literature 2) are known.

Also, a device is conventionally known in which relatively large dust is previously radially blown off by a centrifugal force from an opening provided in a side wall of a swirl chamber in an upper side of a swirl chamber, and collected in a collection chamber through the opening provided in the side wall of the swirl chamber (for example, see Patent Literature 3).

CITATION LIST

Patent Literature

Patent Literature 1: Japanese Patent Laid-Open No. 2010-201167
Patent Literature 2: Japanese Patent Laid-Open No. 2009-055980
Patent Literature 3: Japanese Patent Laid-Open No. 2011-160828
Patent Literature 4: Japanese Patent Laid-Open No. 05-176871

SUMMARY OF INVENTION

Technical Problem

However, in the conventional techniques shown in Patent Literature 1 and Patent Literature 2, the dust collection chamber that collects relatively large dust is provided below the separation chamber, and thus a large amount of airflow flows into the dust collection chamber. Thus, the dust collected in the dust collection chamber is scattered by the airflow having flowed in and returned to the separation chamber, thereby reducing collection performance.

Also, in the conventional technique shown in Patent Literature 3, an airflow in the swirl chamber has a low swirl force, the airflow is prone to move down, and a centrifugal force is low in the upper side of the swirl chamber. Thus, to ensure collection performance, a further swirl chamber needs to be provided on a downstream side, which increases an entire size of a cyclone separation device.

The present invention is achieved to solve the problems, and provides a cyclone separation device that can improve dust separation performance without increasing a size of the device, and prevent a backflow of dust collected in a dust collection chamber, and an electric vacuum cleaner including the cyclone separation device.

Means for Solving the Problems

A cyclone separation device according to the present invention includes: a swirl chamber for swirling air containing dust along a side wall therein to separate dust from the air containing dust; a first dust collection chamber communicating with an inside of the swirl chamber through a first opening formed in the side wall of the swirl chamber; a second dust collection chamber communicating with the inside of the swirl chamber through a second opening formed on a downstream side of the first opening in the swirl chamber; a discharge pipe communicating with a discharge port for discharging air in the swirl chamber; and a plurality of inlets that are provided on an upstream side of the first opening, and through which the air containing dust flows into the swirl chamber.

Also, an electric vacuum cleaner according to the present invention includes: a cyclone separation device formed as mentioned above; and a blower for generating a predetermined airflow in the cyclone separation device.

Advantageous Effects of Invention

With the cyclone separation device and the electric vacuum cleaner including the cyclone separation device according to the present invention, dust separation performance can be improved without increasing a size of the device, and a backflow of dust collected in the dust collection chamber can be prevented.

DESCRIPTION OF EMBODIMENTS

Figure 1:
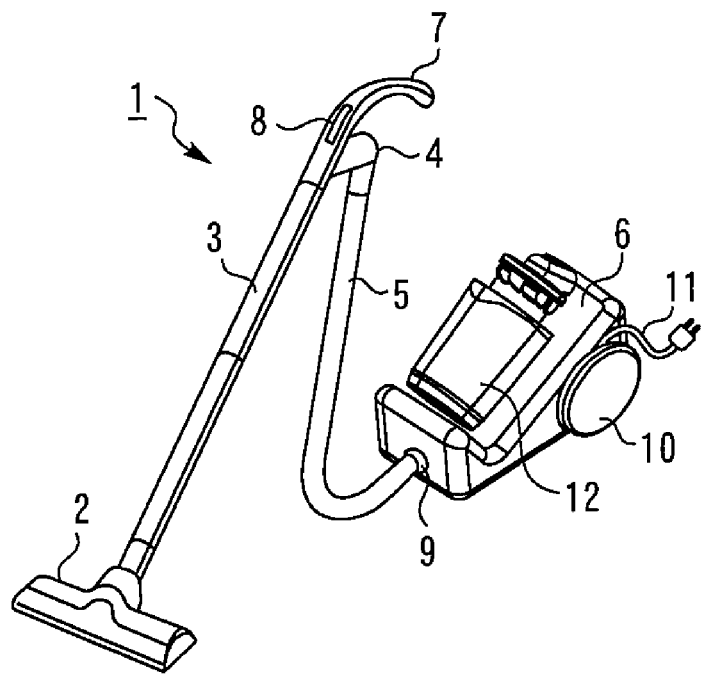
FIG. 1 is a perspective view of an electric vacuum cleaner relating to Embodiment 1 of the present invention.

The present invention will be described with reference to the accompanying drawings. Throughout the drawings, the same reference numerals denote the same or corresponding components, and overlapping descriptions thereof will be simplified or omitted.

Embodiment 1

Figure 2:
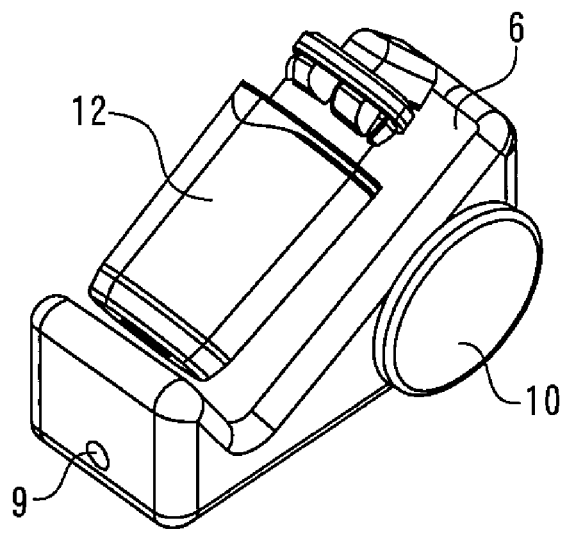
FIG. 2 is a perspective view of a vacuum cleaner body and a dust collection unit of the electric vacuum cleaner relating to Embodiment 1 of the present invention.
Figure 3:
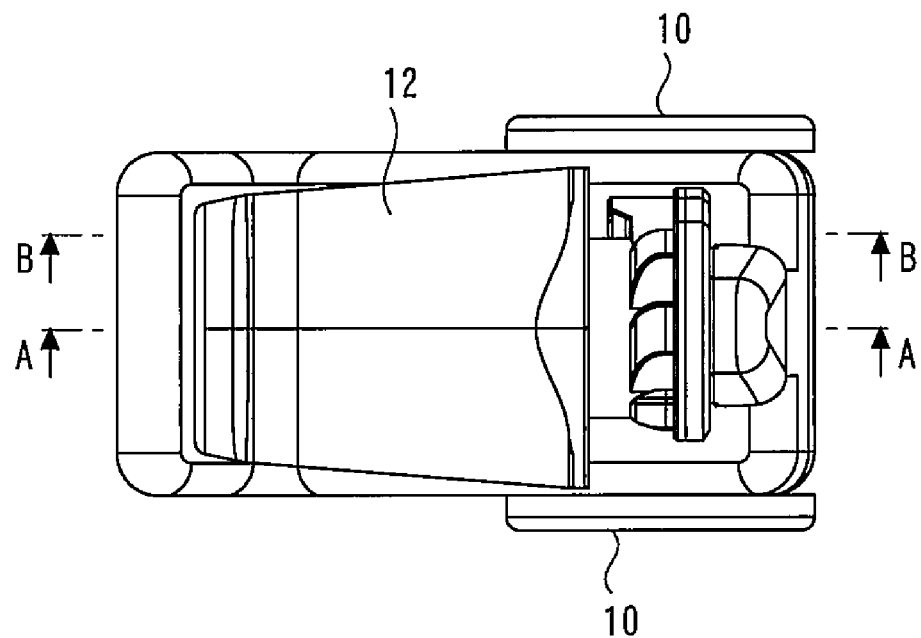
FIG. 3 is a plan view of the vacuum cleaner body and the dust collection unit of the electric vacuum cleaner relating to Embodiment 1 of the present invention.
Figure 4:
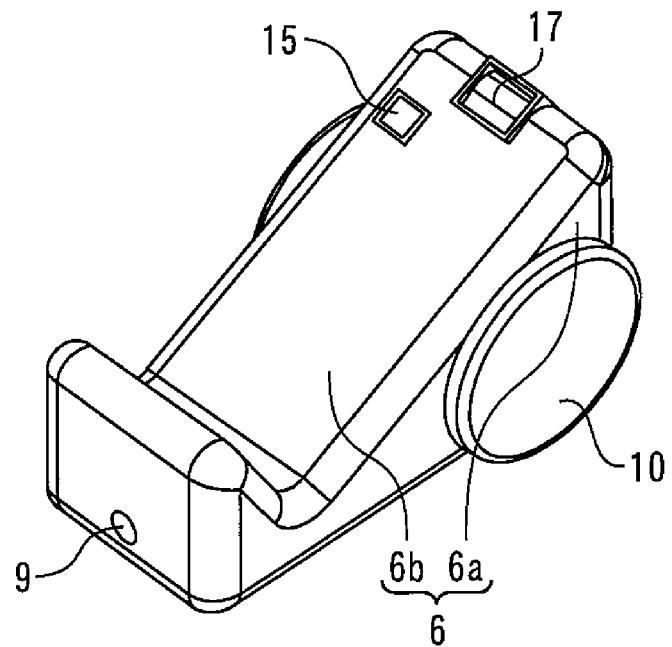
FIG. 4 is a perspective view of the vacuum cleaner body of the electric vacuum cleaner relating to Embodiment 1 of the present invention.
Figure 5:
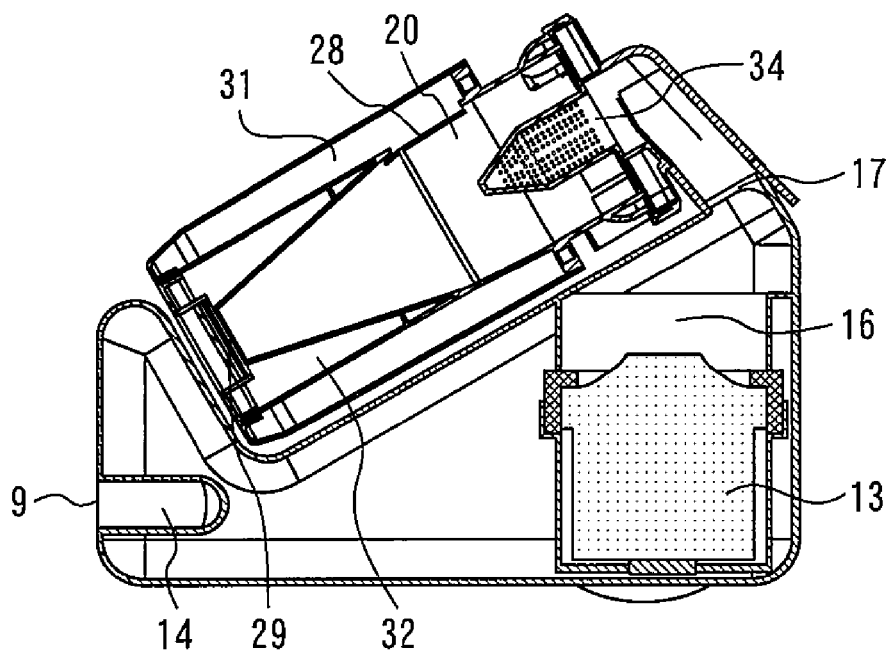
FIG. 5 is an A-A sectional view of the vacuum cleaner body and the dust collection unit in FIG. 3.
Figure 6:
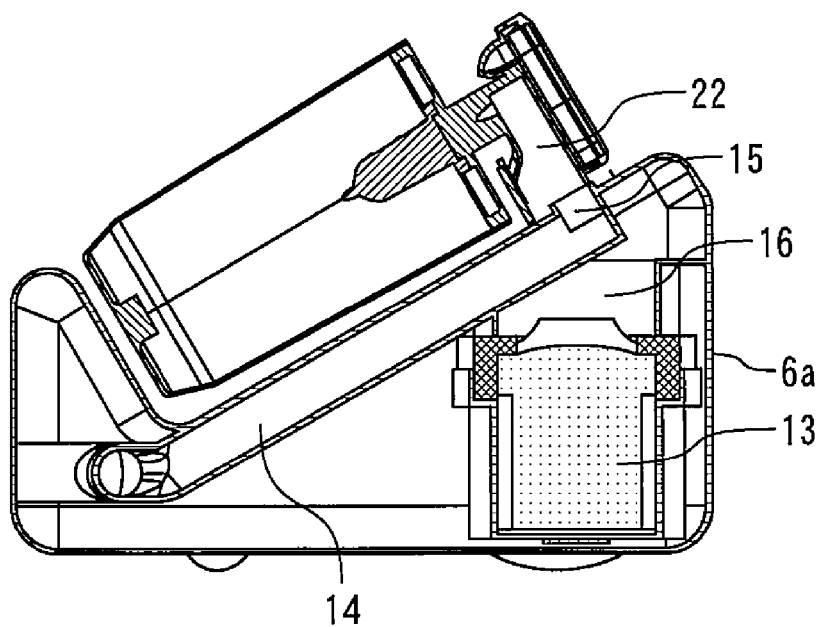
FIG. 6 is a B-B sectional view of the vacuum cleaner body and the dust collection unit in FIG. 3.
Figure 7:
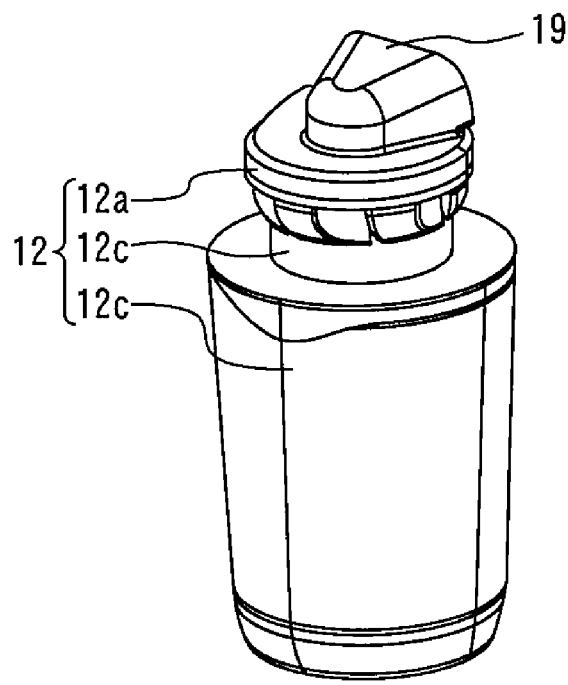
FIG. 7 is a perspective view of the dust collection unit of the electric vacuum cleaner relating to Embodiment 1 of the present invention.
Figure 8:
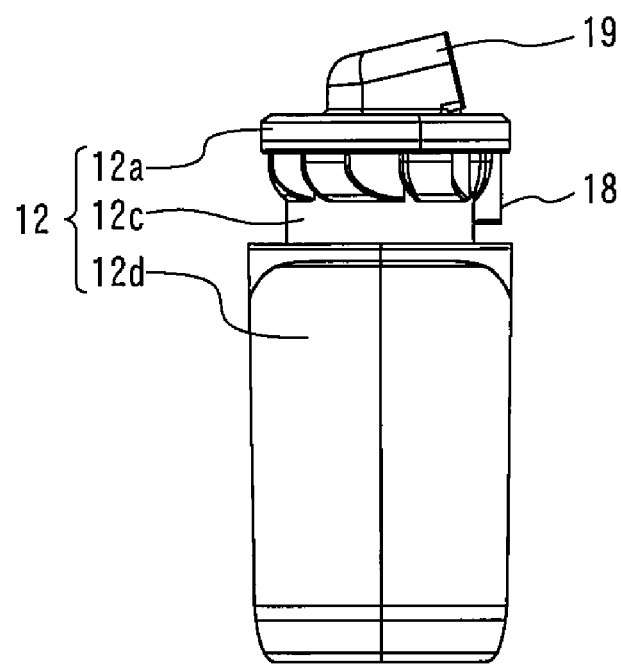
FIG. 8 is a side view of the dust collection unit of the electric vacuum cleaner relating to Embodiment 1 of the present invention.
Figure 9:
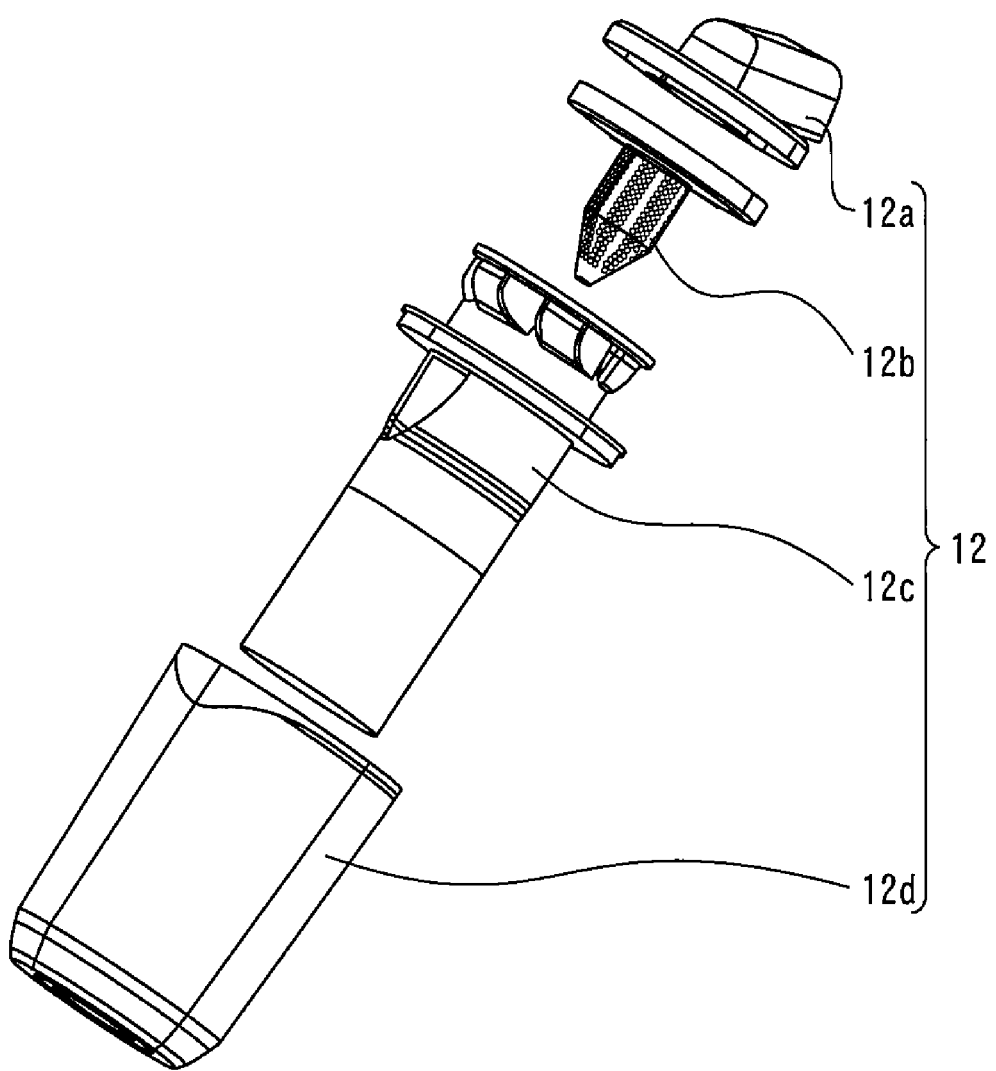
FIG. 9 is an exploded perspective view of the dust collection unit of the electric vacuum cleaner relating to Embodiment 1 of the present invention.
Figure 10:
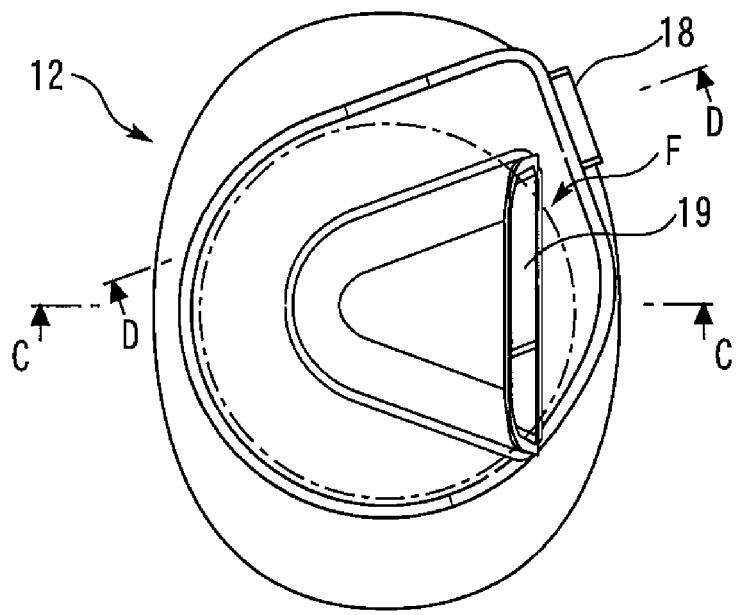
FIG. 10 is a plan view of the dust collection unit of the electric vacuum cleaner relating to Embodiment 1 of the present invention.
Figure 11:
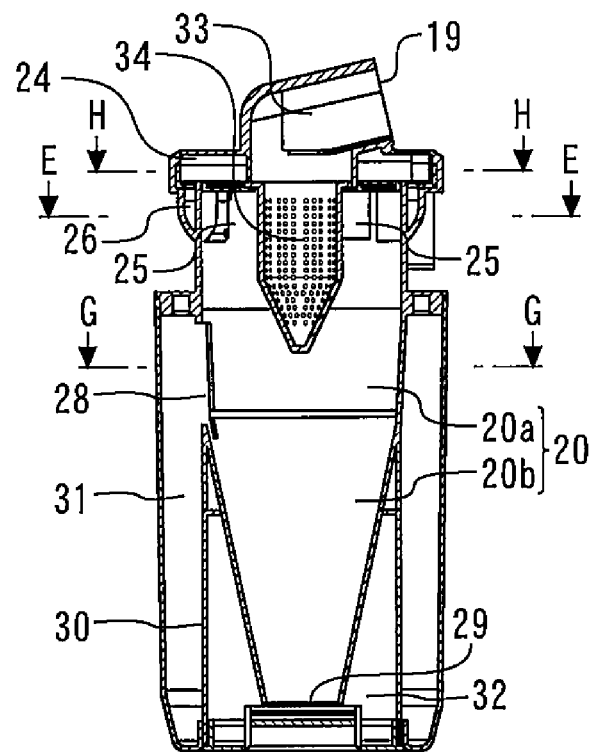
FIG. 11 is a C-C sectional view of the dust collection unit in FIG. 10.
Figure 12:
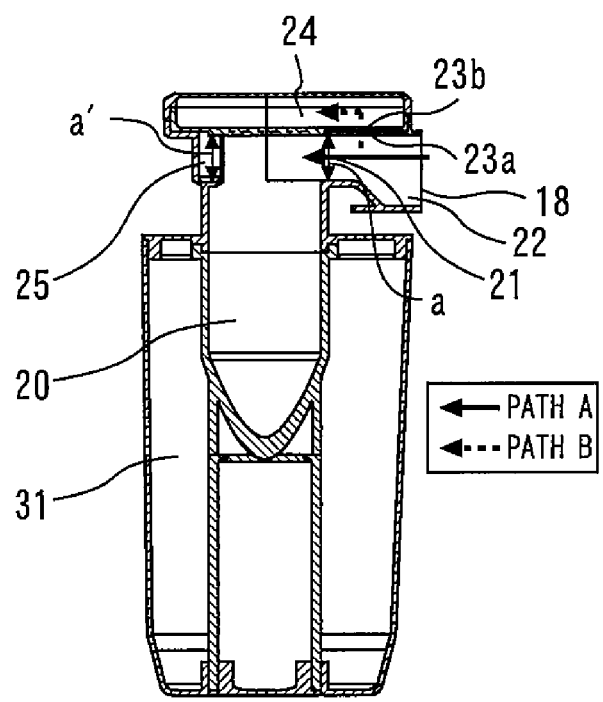
FIG. 12 is a D-D sectional view of the dust collection unit in FIG. 10.
Figure 13:
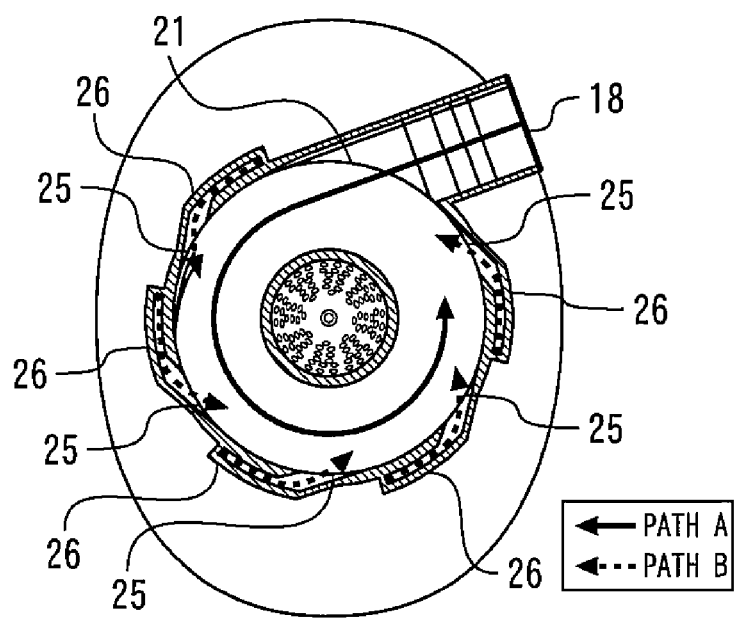
FIG. 13 is an E-E sectional view of the dust collection unit in FIG. 11.
Figure 14:
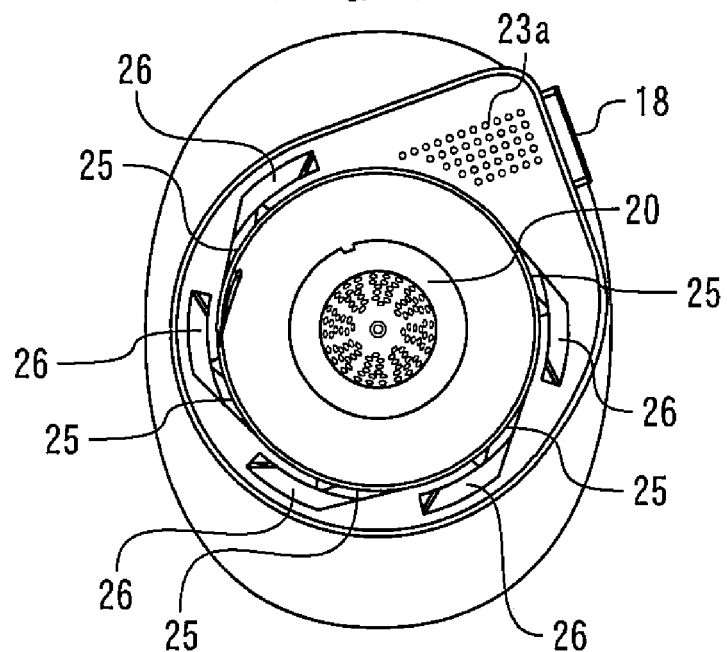
FIG. 14 is a plan view of an inlet portion case of the dust collection unit of the electric vacuum cleaner relating to Embodiment 1 of the present invention.
Figure 15:
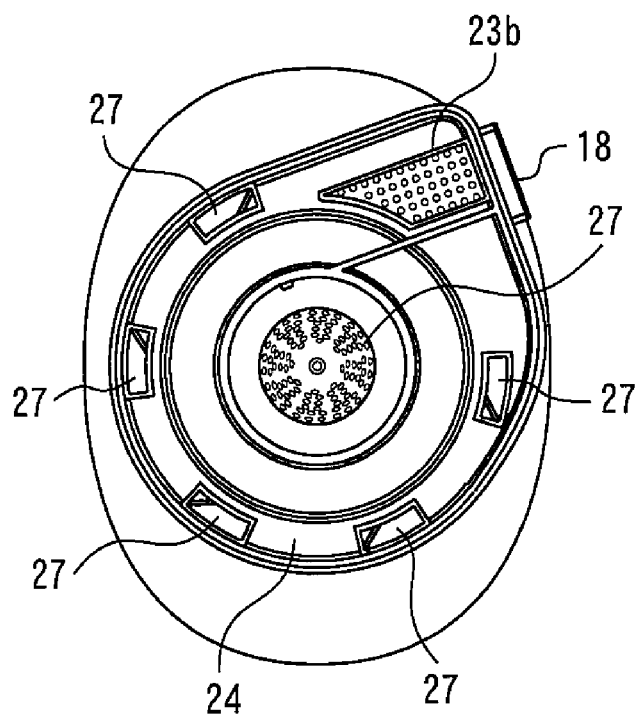
FIG. 15 is a plan view of a bypass portion case of the dust collection unit of the electric vacuum cleaner relating to Embodiment 1 of the present invention.
Figure 16:
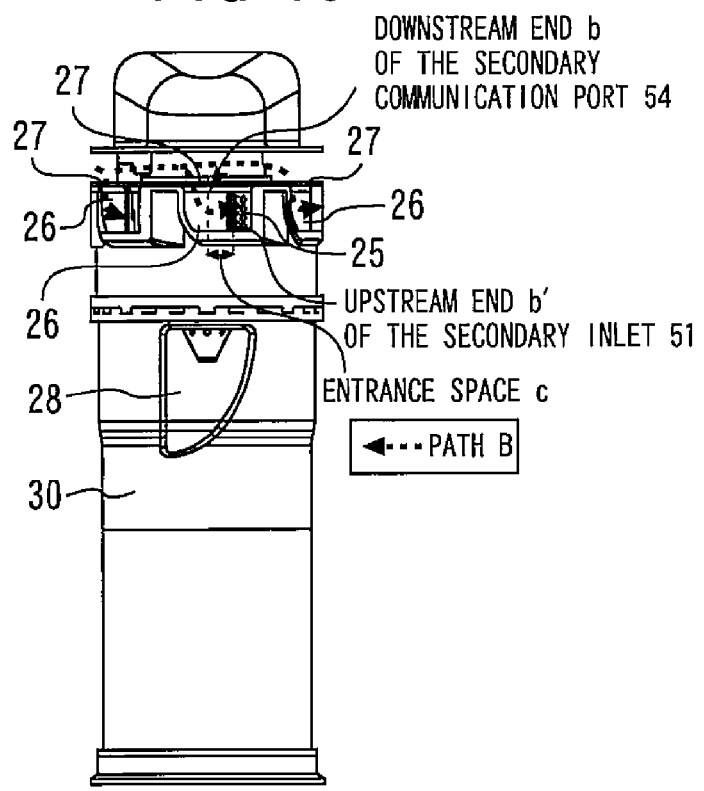
FIG. 16 is a view of the dust collection unit cut along a cut plane F in FIG. 10 seen from the side.
Figure 17:
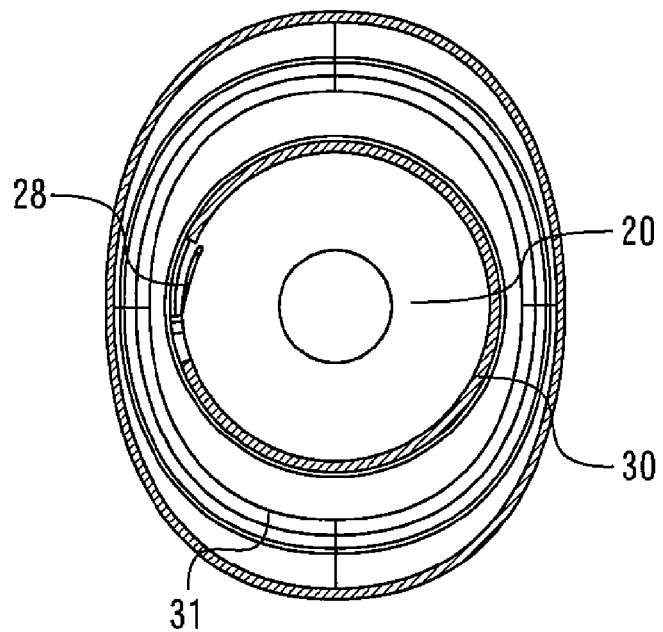
FIG. 17 is a G-G sectional view of the dust collection unit in FIG. 11.
Figure 18:
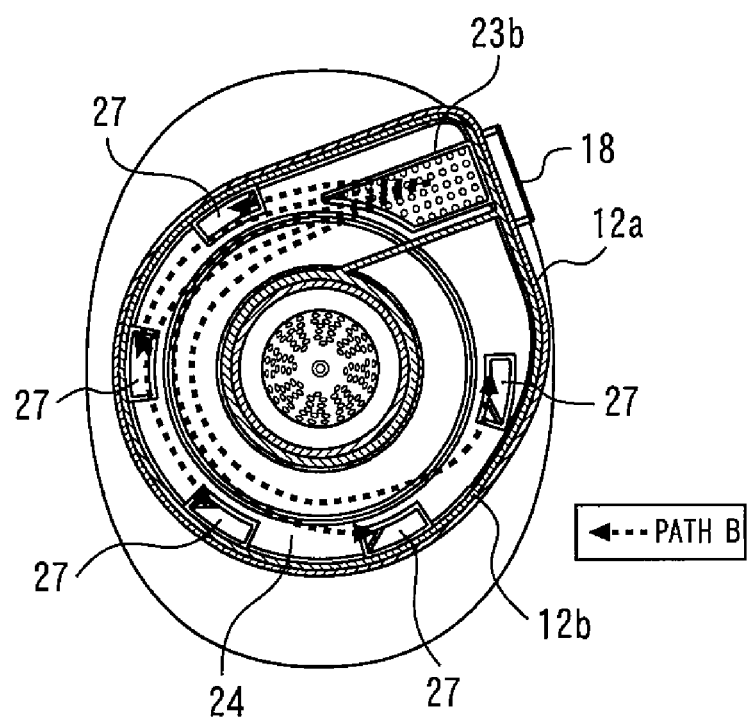
FIG. 18 is an H-H sectional view of the dust collection unit in FIG. 11.

FIGS. 1 to 18 relate to Embodiment 1 of the present invention, FIG. 1 is a perspective view of an electric vacuum cleaner, FIG. 2 is a perspective view of a vacuum cleaner body and a dust collection unit of the electric vacuum cleaner, FIG. 3 is a plan view of the vacuum cleaner body and the dust collection unit of the electric vacuum cleaner, FIG. 4 is a perspective view of the vacuum cleaner body of the electric vacuum cleaner, FIG. 5 is an A-A sectional view of the vacuum cleaner body and the dust collection unit in FIG. 3, FIG. 6 is a B-B sectional view of the vacuum cleaner body and the dust collection unit in FIG. 3, FIG. 7 is a perspective view of the dust collection unit of the electric vacuum cleaner, FIG. 8 is a side view of the dust collection unit of the electric vacuum cleaner, FIG. 9 is an exploded perspective view of the dust collection unit of the electric vacuum cleaner, FIG. 10 is a plan view of the dust collection unit of the electric vacuum cleaner, FIG. 11 is a C-C sectional view of the dust collection unit in FIG. 10, FIG. 12 is a D-D sectional view of the dust collection unit in FIG. 10, FIG. 13 is an E-E sectional view of the dust collection unit in FIG. 11, FIG. 14 is a plan view of an inlet portion case of the dust collection unit of the electric vacuum cleaner, FIG. 15 is a plan view of a bypass portion case of the dust collection unit of the electric vacuum cleaner, FIG. 16 is a view of the dust collection unit cut along a cut plane F in FIG. 10 seen from the side, FIG. 17 is a G-G sectional view of the dust collection unit in FIG. 11, and FIG. 18 is an H-H sectional view of the dust collection unit in FIG. 11.

As shown in FIG. 1, an electric vacuum cleaner 1 includes a suction port body 2, a suction pipe 3, a connection pipe 4, a suction hose 5, and a vacuum cleaner body 6 as essential portions. The suction port body 2 sucks dust on a floor with air through an opening formed downward. A connection portion for exhausting air is provided in a substantially middle portion in a longitudinal direction of the suction port body 2.

An end on one side (an intake side) of the suction pipe 3 is connected to the connection portion of the suction port body 2. The suction pipe 3 is formed of a straight cylindrical member. An end on one side (an intake side) of the connection pipe 4 is connected to the other end of the suction pipe 3. The connection pipe 4 is formed of a cylindrical member bent in a middle.

A handle 7 is provided on the connection pipe 4. The handle 7 is held by a user of the electric vacuum cleaner 1 for operation. The handle 7 has an operation switch 8 for controlling operation of the electric vacuum cleaner 1. An end on one side (an intake side) of the suction hose 5 is connected to the other end of the connection pipe 4. The suction hose 5 is formed of a flexible member having a bellows shape.

The vacuum cleaner body 6 separates dust from air containing dust, and discharges air from which the dust is removed (clean air) (for example, returns the air to a room). A hose connection port 9 is formed in a front end of the vacuum cleaner body 6. The other end of the suction hose 5 is connected to the hose connection port 9 of the vacuum cleaner body 6. Wheels 10 are mounted on both sides of the vacuum cleaner body 6.

The vacuum cleaner body 6 includes a power cord 11. The power cord 11 is wound around a cord reel portion (not shown) in the vacuum cleaner body 6. The power cord 11 is connected to an external power source to energize an internal device such as an electric air blower 13 described later. The electric air blower 13 is driven by energization, and performs predetermined suction depending on operation with the operation switch 8.

The suction port body 2, the suction pipe 3, the connection pipe 4, and the suction hose 5 have inner portions continuously formed. If the electric air blower 13 performs suction, dust on a floor is sucked with air into the suction port body 2. The air containing dust sucked into the suction port body 2 passes through the suction port body 2, the suction pipe 3, the connection pipe 4, and the suction hose 5 in this order, and is fed to the vacuum cleaner body 6. As such, the suction port body 2, the suction pipe 3, the connection pipe 4, and the suction hose 5 form an air trunk for allowing the air containing dust to flow from outside into the vacuum cleaner body 6.

As shown in FIGS. 2 and 3, a dust collection unit 12 is removably mounted to the vacuum cleaner body 6. FIG. 4 shows the dust collection unit 12 being removed from the vacuum cleaner body 6. The vacuum cleaner body 6 includes an electric air blower housing unit 6a and a dust collection unit housing portion 6b.

The electric air blower housing unit 6a is formed of a box-like member (for example, a molded product). A portion from a rear end to a predetermine position closer to a front side of the electric air blower housing unit 6a has an inclined upper surface with a high rear side and a low front side. A portion on a front side of the predetermined position of the electric air blower housing unit 6a has an inclined upper surface with a low rear side and a high front side.

Thus, a part of the upper surface of the electric air blower housing unit 6a has a substantially L shape when seen from the side. The substantially L-shaped portion in the electric air blower housing unit 6a has the dust collection unit housing portion 6b formed thereon. The dust collection unit housing portion 6b includes a space for housing the dust collection unit 12. When the dust collection unit 12 is appropriately mounted to the electric air blower housing unit 6a, essential portions of the dust collection unit 12 are placed in the dust collection unit housing portion 6b, that is, on the electric air blower housing unit 6a.

Further with reference to FIGS. 5 and 6, a configuration of the vacuum cleaner body 6 will be described. The electric air blower housing unit 6a of the vacuum cleaner body 6 houses the electric air blower 13, the cord reel portion, or the like. The electric air blower housing unit 6a has an intake air trunk 14 formed therein for leading air containing dust to the dust collection unit 12 in the vacuum cleaner body 6.

One end of the intake air trunk 14 opens in a front surface of the vacuum cleaner body 6 to form the hose connection port 9. The intake air trunk 14 passes through an internal space of the electric air blower housing unit 6a. The other end of the intake air trunk 14 opens in an upper surface of the electric air blower housing unit 6a (that is, a side of the dust collection unit housing portion 6b) to form a body side outlet 15. The body side outlet 15 is placed closer to a rear end and one side of the upper surface of the electric air blower housing unit 6a.

The dust collection unit 12 separates dust from air containing dust, and temporarily stores the separated dust. The dust collection unit 12 swirls the air containing dust therein to separate dust from air by a centrifugal force. Specifically, the dust collection unit 12 has a cyclone separation function. A specific configuration and function of the dust collection unit 12 will be described later.

An exhaust air trunk 16 for leading air discharged from the dust collection unit 12 (clean air from which dust is removed by the dust collection unit 12) to an exhaust port (not shown) in the vacuum cleaner body 6 is formed in the electric air blower housing unit 6a. One end of the exhaust air trunk 16 opens in the upper surface of the electric air blower housing unit 6a to form a body side inlet 17.

The exhaust air trunk 16 passes through the internal space of the electric air blower housing unit 6a. The other end of the exhaust air trunk 16 opens outward of the electric air blower housing unit 6a to form the exhaust port. The body side inlet 17 is placed substantially at a middle close to the rear end of the upper surface of the electric air blower housing unit 6a.

The electric air blower 13 generates an airflow in the air trunks formed in the electric vacuum cleaner 1 (the air trunk for allowing air containing dust to flow into the vacuum cleaner body 6, the intake air trunk 14, an air trunk described later in the dust collection unit 12, and the exhaust air trunk 16). The electric air blower 13 is placed in the exhaust air trunk 16 in a predetermined position closer to the rear end in the electric air blower housing unit 6a.

When the electric air blower 13 starts suction, an airflow (suction air) is generated in each air trunk formed in the electric vacuum cleaner 1. The air containing dust sucked by the suction port body 2 is taken from the hose connection port 9 into the vacuum cleaner body 6. The air containing dust having flowed into the vacuum cleaner body 6 passes through the intake air trunk 14, and is fed from the body side outlet 15 to the dust collection unit 12. The airflow generated in the dust collection unit 12 will be described later. The air (clean air) discharged from the dust collection unit 12 flows into the exhaust air trunk 16, and passes through the electric air blower 13 in the exhaust air trunk 16. The air having passed through the electric air blower 13 further travels through the exhaust air trunk 16, and is discharged from the exhaust port to the outside of the vacuum cleaner body 6 (electric vacuum cleaner 1).

Next, the dust collection unit 12 will be described in detail. As shown in FIGS. 7 to 10, the dust collection unit 12 generally has a substantially oval cylindrical shape. The dust collection unit 12 includes a discharge portion case 12a, a bypass portion case 12b, an inlet portion case 12c, and a dust collection portion case 12d.

The discharge portion case 12a, the bypass portion case 12b, the inlet portion case 12c, and the dust collection portion case 12d are formed of, for example, molded products. The discharge portion case 12a, the bypass portion case 12b, the inlet portion case 12c, and the dust collection portion case 12d are configured to be disassembled into a state in FIG. 9 or assembled into a state in FIG. 7 by predetermined operation (for example, operation of a lock mechanism). Also, only the dust collection portion case 12d may be removed from the state in FIG. 7.

Now, the dust collection unit 12 configured by an appropriate combination of the discharge portion case 12a, the bypass portion case 12b, the inlet portion case 12c, and the dust collection portion case 12d will be described. In the descriptions on the dust collection unit 12 below, upper and lower sides are specified with reference to the direction in FIG. 8.

As shown in FIGS. 7, 8, and 10, a unit side inlet 18 is formed in one side of the inlet portion case 12c of the dust collection unit 12. Also, a unit side outlet 19 is formed substantially at a middle of the discharge portion case 12a of the dust collection unit 12. The unit side outlet 19 is placed above the unit side inlet 18. The unit side inlet 18 and the unit side outlet 19 open toward the same side. The unit side outlet 19 is placed above the unit side inlet 18.

As shown in FIG. 11, the inlet portion case 12c includes a swirl chamber 20. An upper portion of the swirl chamber 20 is constituted by a cylindrical portion 20a. A lower portion of the swirl chamber 20 is constituted by a conical portion 20b.

The cylindrical portion 20a has a hollow cylindrical shape. The cylindrical portion 20a is placed so that a central axis thereof is vertically directed. The conical portion 20b has a hollow truncated conical shape. The conical portion 20b is vertically placed so that a central axis thereof matches the central axis of the cylindrical portion 20a. An upper end of the conical portion 20b is connected to a lower end of the cylindrical portion 20a, and the conical portion 20b is provided to extend downward from the lower end of the cylindrical portion 20a with a diameter decreasing downward.

A continuous space formed by an internal space of the cylindrical portion 20a and an internal space of the conical portion 20b formed in this manner constitutes the swirl chamber 20. The swirl chamber 20 is a space for swirling air containing dust.

As shown in FIGS. 12 and 13, a main inlet 21 is formed in the upper portion of the cylindrical portion 20a (an uppermost portion of a side wall that forms the swirl chamber 20). One end of a main inlet pipe 22 is connected to the main inlet 21. The other end of the main inlet pipe 22 is connected to the unit side inlet 18. The main inlet pipe 22 leads air containing dust having passed through the intake air trunk 14 into the cylindrical portion 20a (swirl chamber 20). An internal space of the main inlet pipe 22 forms a main inlet air trunk. The main inlet air trunk is one of air trunks for allowing the air containing dust to flow from the intake air trunk 14 into the swirl chamber 20.

The main inlet pipe 22 has, for example, a hollow square shape and is formed of a straight member. The main inlet pipe 22 has an axis perpendicular to the central axis of the cylindrical portion 20a, and placed tangentially of the cylindrical portion 20a (a side wall of the swirl chamber 20).

Here, particularly as shown in FIG. 12, a lower wall surface of the main inlet pipe 22 is further inclined upward in the central axis direction of the swirl chamber 20 closer to the main inlet 21. In other words, the lower wall surface of the main inlet pipe 22 is inclined so that a sectional area of an air trunk of the main inlet pipe 22 decreases toward the main inlet 21.

As shown in FIG. 14, a first bypass communication port 23a is provided in an upper wall of the main inlet pipe 22 in the inlet portion case 12c. The first bypass communication port 23a is formed of a set of a plurality of micropores bored in the upper wall of the main inlet pipe 22. Also as shown in FIG. 15, a second bypass communication port 23b is provided in a predetermined position in a bottom surface of the bypass portion case 12b. The second bypass communication port 23b is formed of a set of a plurality of micropores bored in the bottom surface of the bypass portion case 12b.

When the inlet portion case 12c and the bypass portion case 12b are appropriately combined to constitute the dust collection unit 12, the first bypass communication port 23a in the inlet portion case 12c and the second bypass communication port 23b in the bypass portion case 12b overlap each other to constitute one bypass communication port. The bypass communication port thus formed provides communication between the space in the main inlet pipe 22 (that is, the main inlet air trunk) and the space in the bypass portion case 12b.

The second bypass communication port 23b is configured so as not to block the micropores that constitute the first bypass communication port 23a when overlapping the first bypass communication port 23a. Thus, for example, an opening diameter of the micropore that constitutes the second bypass communication port 23b is larger than an opening diameter of the micropore that constitutes the first bypass communication port 23a.

A bypass air trunk 24 is formed in the space in the bypass portion case 12b. The bypass air trunk 24 is formed to extend in a swirl direction of the swirl chamber 20. The bypass communication port constituted by the first bypass communication port 23a and the second bypass communication port 23b is an opening for taking a part of the air containing dust in the main inlet air trunk of the main inlet pipe 22 into the bypass air trunk 24. The dust collection unit 12 includes the main inlet air trunk described above and also a bypass inlet air trunk as air trunks for causing the air containing dust to flow from the intake air trunk 14 into the swirl chamber 20.

With the above described configuration, both an operational effect of ensuring a flow path area (a total opening area) of the bypass communication port to reduce pressure loss, thereby ensuring an airflow to the bypass air trunk 24, and an operational effect of preventing larger dust than the opening diameter of the micropore that constitutes the first bypass communication port 23a from entering the bypass air trunk 24 can be obtained.

The air containing dust having flowed from the intake air trunk 14 through the bypass communication port (the first bypass communication port 23a and the second bypass communication port 23b) into the bypass air trunk 24 passes through the bypass air trunk 24, and is then taken from a secondary inlet 25 into the cylindrical portion 20a (swirl chamber 20).

The secondary inlet 25 is formed in an upper portion of the cylindrical portion 20a (the uppermost portion of the side wall that forms the swirl chamber 20) like the main inlet 21. For example, the secondary inlet 25 is placed at the same height as the main inlet 21. In other words, the main inlet 21 and each secondary inlet 25 are provided in substantially equal positions in the central axis direction of the swirl chamber 20. Here, five secondary inlets 25 are provided.

The secondary inlet 25 and the bypass air trunk 24 are connected by a secondary inlet pipe 26. A secondary communication port 27 is bored in a bottom surface of the bypass air trunk 24 in the bypass portion case 12b. The secondary communication port 27 is provided correspondingly to each secondary inlet 25. Thus, the secondary communication ports 27 of the same number as the secondary inlets 25 are provided. Here, since the number of the secondary inlets 25 is five, the number of the secondary communication ports 27 is also five.

The secondary inlet 25 and the secondary communication port 27 corresponding to each other are connected by the secondary inlet pipe 26. Thus, the number of the secondary inlet pipes 26 is also the same as the number of the secondary inlets 25 and the number of the secondary communication port 27 (herein five). The secondary inlet pipe 26 is provided on the upper portion of the cylindrical portion 20a of the inlet portion case 12c so as to surround an outer periphery of the cylindrical portion 20a. The secondary inlet pipe 26 is connected tangentially to the side wall of the cylindrical portion 20a in the secondary inlet 25.

The secondary inlet 25 is formed so that an opening area thereof is smaller than an opening area of the main inlet 21. Specifically, the main inlet 21 has the maximum opening area among the inlets. Here, particularly as shown in FIG. 12, an opening size a of the main inlet 21 in the central axis direction of the swirl chamber 20 and an opening size a' of each secondary inlet 25 in the central axis direction of the swirl chamber 20 are adjusted to be substantially the same.

Also, as shown in FIG. 16, a downstream end b of the secondary communication port 27 in the swirl direction of the swirl chamber 20 is placed on an upstream side in the swirl direction of the swirl chamber 20 from an upstream end b' of the secondary inlet 25 corresponding to the secondary communication port 27 in the swirl direction of the swirl chamber 20. Thus, in the secondary inlet pipe 26 that connects the secondary communication port 27 and the secondary inlet 25 corresponding to each other, an entrance space c as an extending portion in the swirl direction of the swirl chamber 20 is formed. In the entrance space c, the airflow flows in the secondary inlet pipe 26 in the swirl direction of the swirl chamber 20.

As shown in FIG. 16, the bypass air trunk 24 as an air trunk from the second bypass communication port 23b to the secondary communication port 27 is formed of an inner surface of a side wall of the bypass portion case 12b and an inner surface of an upper wall of the discharge portion case 12a. An upper end surface of the secondary inlet pipe 26 that forms an air trunk from the secondary communication port 27 to the secondary inlet 25 is formed of a part of the bottom surface of the bypass portion case 12b.

As shown in FIG. 11, a zero-order opening 28 is formed in the side wall of the cylindrical portion 20a of the swirl chamber 20. The zero-order opening 28 is placed below the unit side inlet 18 in the central axis direction of the swirl chamber 20. More specifically, the zero-order opening 28 is placed below the main inlet 21 and all of the secondary inlets 25 in the central axis direction of the swirl chamber 20, that is, on the downstream side of the airflow in the swirl chamber 20.

A lower end of the conical portion 20b of the swirl chamber 20 opens downward (in the central axis direction). The opening formed at the lower end of the conical portion 20b is a primary opening 29. Thus, the primary opening 29 is placed on the downstream side of the zero-order opening 28 in the airflow in the swirl chamber 20. A partition 30 is provided outside the conical portion 20b. The partition 30 has a substantially cylindrical shape having substantially the same diameter as the cylindrical portion 20a. An upper end of the partition 30 is connected near the connection portion between the cylindrical portion 20a and the conical portion 20b.

The dust collection portion case 12d has a substantially oval cylindrical shape with a closed lower side and an open upper side. The dust collection portion case 12d is placed outside and on a lower side of the inlet portion case 12c. In this state, a lower side from an upper end of the zero-order opening 28 in the cylindrical portion 20a of the inlet portion case 12c, the conical portion 20b, and the partition 30 are entirely housed in the dust collection portion case 12d. A lower end of the partition 30 engages a protrusion formed on a bottom surface of the dust collection portion case 12d.

As such, a space formed between the inlet portion case 12c and the dust collection portion case 12d is partitioned into two by the partition 30. Among two spaces thus formed, the space formed outside the cylindrical portion 20a and the partition 30 is a zero-order dust collection chamber 31, and the space formed below and outside the conical portion 20b and inside the partition 30 is a primary dust collection chamber 32.

The zero-order dust collection chamber 31 surrounds the entire outer periphery of the swirl chamber 20. The zero-order dust collection chamber 31 extends downward from the zero-order opening 28. The primary dust collection chamber 32 extends around the entire periphery of the conical portion 20b from below the primary opening 29.

A mesh-like discharge port 34 is provided at a center of an upper end of the cylindrical portion 20a. The discharge port 34 is formed of micropores opening in a part of a side wall and a lower side of a pipe having a substantially cylindrical upper portion and a substantially conical lower portion. Thus, as compared to a discharge port opening only in the lower side of the pipe, a force to suck the airflow in the swirl chamber 20 in the swirl direction is increased to allow a swirl airflow in the swirl chamber 20 to easily travel in the swirl direction. Thus, a swirl force of the airflow in the upper side in the swirl chamber 20 can be increased to further improve separation performance. A discharge pipe 33 provides communication between the discharge port 34 and the unit side outlet 19. In other words, a part of the mesh-like discharge port 34 described above is formed of the micropores opening in a part of a side wall of the discharge pipe 33. The discharge pipe 33 is mainly constituted by the discharge portion case 12a. The discharge port 34 is formed in the bypass portion case 12b, and an upper end wall of the swirl chamber 20 is formed of a part of a bottom surface of the bypass portion case 12b.

If the dust collection unit 12 having the above described configuration is appropriately mounted to the dust collection unit housing portion 6b, a central axis of the swirl chamber 20 or the like is obliquely placed to match a slope of the dust collection unit housing portion 6b. Then, the unit side inlet 18 and the unit side outlet 19 are placed to face the slope, and the unit side inlet 18 is connected to the body side outlet 15. The unit side outlet 19 is connected to the body side inlet 17 (FIGS. 5 and 6).

Next, a function of the dust collection unit 12 having the above-described function will be described. When the electric air blower 13 starts suction, the air containing dust passes through the intake air trunk 14 and reaches the body side outlet 15 as described above. The air containing dust successively passes through the body side outlet 15 and the unit side inlet 18, and flows into the main inlet pipe 22, that is, into a main inlet air trunk. A part of the air containing dust having flowed into the main inlet air trunk travels in the axial direction of the main inlet pipe 22 (travels straight), and flows through the main inlet 21 into the cylindrical portion 20a (swirl chamber 20). Such a path is shown as a path A by a solid arrow in the drawing.

On the other hand, the other part of the air containing dust having flowed into the main inlet air trunk enters a different path (a path 13 indicated by a broken arrow in the drawing) from a middle of the path A.

Specifically, the part of the air containing dust flowing through the main inlet air trunk changes its traveling direction to an upward direction from the axial direction of the main inlet pipe 22 and reaches the first bypass communication port 23a. The air containing dust successively passes through the first bypass communication port 23a and the second bypass communication port 23b, and flows into the bypass air trunk 24 as a space between the bypass portion case 12b and the discharge portion case 12a above the inlet portion case 12c.

The air containing dust having flowed into the bypass air trunk 24 moves in the swirl direction of air in the swirl chamber 20 so as to cross above the swirl chamber 20 in the bypass air trunk 24. The air containing dust moves downward through the secondary communication port 27, and flows into the secondary inlet pipe 26 formed outside the swirl chamber 20. In the secondary inlet pipe 26, the air containing dust moves in the swirl direction of the air in the swirl chamber 20. The air containing dust flows from the inside of the secondary inlet pipe 26 through the secondary inlet 25 into the cylindrical portion 20a (swirl chamber 20).

The air containing dust having passed through the main inlet 21 tangentially flows into the swirl chamber 20 along an inner peripheral surface of the cylindrical portion 20a (an inner wall surface of the swirl chamber 20). The air containing dust having passed through the secondary inlet 25 also tangentially flows into the swirl chamber 20 along the inner peripheral surface of the cylindrical portion 20a.

The air containing dust taken from the main inlet 21 and the secondary inlet 25 into the swirl chamber 20 forms a swirl airflow that turns in a predetermined direction along the side wall in the swirl chamber 20. The swirl airflow flows downward by a path structure and gravity thereof while forming a forced vortex region near the central axis and a free vortex region outside the forced vortex region.

A centrifugal force is applied to the dust contained in the swirl airflow (air in the swirl chamber 20). For example, relatively large dust such as fiber dust or hair (such dust is hereinafter referred to as "dust α") falls in the swirl chamber 20 while being pressed against the inner peripheral surface of the cylindrical portion 20a (the inner wall surface of the swirl chamber 20) by the centrifugal force. When reaching the height of the zero-order opening 28, the dust α is separated from the swirl airflow, and fed through the zero-order opening 28 to the zero-order dust collection chamber 31. The dust α having entered the zero-order dust collection chamber 31 from the zero-order opening 28 falls in the zero-order dust collection chamber 31 while moving in the same direction as the direction of the airflow swirling in the swirl chamber 20 (swirl direction). Then, the dust α reaches a lowermost portion of the zero-order dust collection chamber 31 and is collected.

Dust that has not entered the zero-order dust collection chamber 31 from the zero-order opening 28 travels downward while swirling in the swirl chamber 20 on the airflow in the swirl chamber 20. Relatively small dust such as sand dust or fine fiber dust (such dust is hereinafter referred to as "dust β") passes through the primary opening 29. Then, the dust β falls into the primary dust collection chamber 32 and is captured.

When the airflow swirling in the swirl chamber 20 reaches the lowermost portion of the swirl chamber 20, the airflow changes its traveling direction to an upward direction, and rises along the central axis of the swirl chamber 20. The dust α and the dust β are removed from the air that forms the rising airflow. The airflow from which the dust α and the dust β are removed (clean air) passes through the discharge port 34 and is discharged to the outside of the swirl chamber 20. The air discharged from the swirl chamber 20 passes through the inside of the discharge pipe 33, and reaches the unit side outlet 19. Then, the clean air successively passes through the unit side outlet 19 and the body side inlet 17, and is fed to the exhaust air trunk 16.

The electric air blower 13 performs suction, and thus as described above, the dust α accumulates in the zero-order dust collection chamber 31 and the dust β accumulates in the primary dust collection chamber 32. The dust α and the dust β can be easily disposed of by removing the dust collection portion case 12d from the dust collection unit 12.

In the dust collection unit 12 configured as described above, the air containing dust flows from the main inlet 21 and the secondary inlet 25 into the swirl chamber 20 so as to successively push the swirl airflow in the swirl chamber 20 from behind. Specifically, the air containing dust newly taken into the swirl chamber 20 flows into the swirl chamber 20 so as to accelerate the swirl airflow already formed in the swirl chamber 20.

This can increase a swirl force, particularly above the zero-order opening 28, in the swirl chamber 20 and significantly improve a function of separating dust (particularly relatively large dust α) (separation function). Thus, there is no need to provide a different separation device on the upstream side or the downstream side of the dust collection unit 12. This can reduce the size of the dust collection unit 12, and reduce the sizes of the vacuum cleaner body 6 and the electric vacuum cleaner 1.

A reduction in the swirl force in the swirl chamber 20 reduces the separation performance is reduced. For example, in a case of taking the air containing dust only from the main inlet into the swirl chamber, a speed (flow speed) of air flowing from the main inlet into the swirl chamber needs to be increased to ensure a predetermined swirl force. This increases sizes of the electric blower, the vacuum cleaner body, and the electric vacuum cleaner. The dust collection unit 12 with the above described configuration allows a reduction in size of the device in such terms.

The increased swirl force above the zero-order opening 28 in the swirl chamber 20, which prevents the swirl airflow from moving downward, simply represents that a component of the airflow in the swirl direction above the zero-order opening 28 in the swirl chamber 20 is larger, and a component of the airflow moving downward is smaller. This can prevent the dust α accumulating on the bottom surface of the zero-order dust collection chamber 31 from being swirled up and scattered by the airflow having flowed into the zero-order dust collection chamber 31, and improve collection performance.

Also, since the bypass communication port 23a is provided in the side wall of the main inlet pipe 22, a traveling direction of the air containing dust flowing from the main inlet pipe 22 through the bypass communication port 23a into the bypass air trunk 24 is significantly bent in the main inlet pipe 22. This particularly prevents the large dust α from passing through the first bypass communication port 23a. This can prevent the bypass air trunk 24 from being clogged with the dust without separately providing a swirl chamber for previously removing the dust α that easily causes clogging on the upstream side of the bypass communication port 23a, and reduce the size of the device.

Also, the secondary inlet pipe 26 extends in the swirl direction of the swirl chamber 20, and thus the airflow flowing into the swirl chamber 20 easily travels in the swirl direction. This can increase the swirl force of the airflow in the upper side in the swirl chamber 20 to further improve separation performance.

Also, as described above, since the bypass air trunk 24 is formed to extend in the swirl direction of the swirl chamber 20, the airflow having flowed into the bypass air trunk 24 moves in the swirl direction of the air in the swirl chamber 20. This allows the airflow flowing from the bypass air trunk 24 into the swirl chamber 20 to more easily travel in the swirl direction, and can increase the swirl force of the airflow in the upper side in the swirl chamber 20 to further improve separation performance.

The main inlet 21 and each secondary inlet 25 are provided in a substantially equal height position in the central axis direction of the swirl chamber 20. Thus, the airflow flowing from each secondary inlet 25 into the swirl chamber 20 pushes the airflow flowing from the main inlet 21 in the swirl direction of the swirl chamber 20. This allows the airflow to more easily travel in the swirl direction, and can increase the swirl force in the upper side in the swirl chamber 20 to further improve separation performance.

The above-described effects may be further enhanced by placing the secondary inlet 25 on the upper side from the main inlet 21 in the central axis direction of the swirl chamber 20.

Further, the plurality of secondary inlets 25 may be placed further on the upper side in the central axis direction of the swirl chamber 20 closer to the downstream side in the swirl direction of the swirl chamber 20 with reference to the main inlet 21. Setting a positional relationship between the main inlet 21 and the plurality of secondary inlets 25 in this manner allows the airflow having moved down on the downstream side in the swirl direction as compared to on the upstream side to be pushed further upward, thereby further enhancing the effects described above.

Also, the main inlet 21 and each secondary inlet 25 have substantially the same opening size in the central axis direction of the swirl chamber 20. This allows airflows flowing from the inlets into the swirl chamber 20 to smoothly merge, and can further increase the swirl force to further improve separation performance.

The downstream end of the secondary communication port 27 in the swirl direction of the swirl chamber 20 is placed on the upstream side of the secondary inlet 25 corresponding to the secondary communication port 27 in the swirl direction of the swirl chamber 20, that is, the entrance space c extending in the swirl direction of the swirl chamber 20 is provided in the secondary inlet pipe 26. Thus, a component of an airflow speed in the swirl direction is enhanced before the airflow flows into the swirl chamber 20, and the airflow flowing into the swirl chamber 20 more easily travels in the swirl direction, thereby increasing the swirl force in the upper side in the swirl chamber 20 to further improve separation performance.

Also, the main inlet pipe 22 has the wall surface inclined further toward the upper side in the central axis direction of the swirl chamber 20 closer to the main inlet 21. Thus, the airflow flowing from the main inlet 21 into the swirl chamber 20 is directed upward to prevent the swirl airflow from moving down, thereby increasing the swirl force in the upper side in the swirl chamber 20 to further improve separation performance.

Also, the bypass air trunk 24 is placed above the swirl chamber 20, thereby reducing a total length of the bypass air trunk 24 with a simple configuration. This allows the dust collection unit 12 to be compact, and can increase usability.

Here, the number of the secondary inlets 25 is five, but one or more secondary inlets 25 may be provided other than the main inlet 21 to expect certain effects on the points described above. Further, a plurality of inlets having an equal relationship may be provided without differentiating between the main inlet 21 and the secondary inlet 25 to expect certain effects on the points described above.

Further, here, the case where the bypass inlet 41 is formed on the upper surface of the main inlet pipe 22 (the upper wall that forms the main inlet air trunk) has been described, however, the bypass inlet 41 may be formed in any position in the main inlet pipe 22 to expect certain effects.

Additionally, here, the case where the dust collection unit 12 having the above-described configuration is applied to the electric vacuum cleaner 1 of the canister type has been described as an example, but the dust collection unit 12 may be applied to an electric vacuum cleaner 1 of a type other than the canister type (for example, a stick type or a handy type).

INDUSTRIAL APPLICABILITY

The present invention may be applied to a cyclone separation device that swirls air containing dust along a side wall therein, and includes a swirl chamber that separates dust from the air containing dust, and an electric vacuum cleaner including the cyclone separation device.

DESCRIPTION OF SYMBOLS 1 electric vacuum cleaner, 2 suction port body, 3 suction pipe, 4 connection pipe, 5 suction hose, 6 vacuum cleaner body, 6a electric air blower housing unit, 6b dust collection unit housing portion, 7 handle, 8 operation switch, 9 hose connection port, 10 wheels, 11 power cord, 12 dust collection unit, 12a discharge portion case, 12b bypass portion case, 12c inlet portion case, 12d dust collection portion case, 13 electric air blower, 14 intake air trunk, 15 body side outlet, 16 exhaust air trunk, 17 body side inlet, 18 unit side inlet, 19 unit side outlet, 20 swirl chamber, 20a cylindrical portion, 20b conical portion, 21 main inlet, 22 main inlet pipe, 23a first bypass communication port, 23b second bypass communication port, 24 bypass air trunk, 25 secondary inlet, 26 secondary inlet pipe, 27 secondary communication port, 28 zero-order opening, 29 primary opening, 30 partition, 31 zero-order dust collection chamber, 32 primary dust collection chamber, 33 discharge pipe, 34 discharge port

The invention claimed is:

1. A cyclone separation device comprising:
a swirl chamber for swirling air containing dust along a side wall therein in a spiral manner around a central axis to separate dust from the air containing dust;
a first dust collection chamber communicating with an inside of the swirl chamber through a first opening formed in the side wall of the swirl chamber;
a second dust collection chamber communicating with the inside of the swirl chamber through a second opening formed on a downstream side of the first opening in the swirl chamber;
a discharge pipe communicating with a discharge port for discharging air in the swirl chamber;
a plurality of inlets through which the air containing dust flows into the swirl chamber, the inlets being provided on an upstream side of the first opening, wherein
the plurality of inlets include a main inlet having a maximum opening area and at least one secondary inlet other than the main inlet, and
the first opening is placed on a downstream side of the main inlet and the secondary inlet;
a main inlet pipe connected to the main inlet;
a secondary inlet pipe connected to the secondary inlet; and
a bypass air trunk communicating with the main inlet pipe through a main communication port provided in a wall portion of the main inlet pipe, the bypass air trunk communicating with the secondary inlet pipe through a secondary communication port.

2. The cyclone separation device according to claim 1, wherein the discharge port is formed by opening in a part of a side wall of the discharge pipe.

3. The cyclone separation device according to claim 1, wherein the secondary inlet pipe is formed to extend in a swirl direction of the swirl chamber.

4. The cyclone separation device according to claim 1, wherein the bypass air trunk is formed to extend in the swirl direction of the swirl chamber.

5. The cyclone separation device according to claim 1, therein the secondary inlet is provided in an equal position to or on an upper side of the main inlet in a central axis direction of the swirl chamber.

6. The cyclone separation device according to claim 1, wherein a downstream end of the secondary communication port in the swirl direction of the swirl chamber is placed on an upstream side of the secondary inlet in the swirl direction of the swirl chamber.

7. A cyclone separation device comprising:
a swirl chamber for swirling air containing dust along a side wall therein in a spiral manner around a central axis to separate dust from the air containing dust;
a first dust collection chamber communicating with an inside of the swirl chamber through a first opening formed in the side wall of the swirl chamber;
a second dust collection chamber communicating with the inside of the swirl chamber through a second opening formed on a downstream side of the first opening in the swirl chamber;
a discharge pipe communicating with a discharge port for discharging air in the swirl chamber;
a plurality of inlets through which the air containing dust flows into the swirl chamber, the inlets being provided on an upstream side of the first opening, wherein the plurality of inlets include a main inlet having a maximum opening area and at least one secondary inlet other than the main inlet, and the first opening is placed on a downstream side of the main inlet and the secondary inlet,
a main inlet pipe connected to the main inlet;
a secondary inlet pipe connected to the secondary inlet; and
a bypass air trunk communicating with the main inlet pipe through a main communication port provided in a wall portion of the main inlet pipe, the bypass air trunk communicating with the secondary inlet pipe through a secondary communication port, wherein at least one of the main inlet pipe and the secondary inlet pipe has a wall surface inclined further toward the upper side in the central axis direction of the swirl chamber closer to the main inlet or the secondary inlet to which the inlet pipe is connected.

8. A cyclone separation device comprising:

a swirl chamber for swirling air containing dust along a side wall therein in a spiral manner around a central axis to separate dust from the air containing dust;

a first dust collection chamber communicating with an inside of the swirl chamber through a first opening formed in the side wall of the swirl chamber;

a second dust collection chamber communicating with the inside of the swirl chamber through a second opening formed on a downstream side of the first opening in the swirl chamber;

a discharge pipe communicating with a discharge port for discharging air in the swirl chamber;

a plurality of inlets through which the air containing dust flows into the swirl chamber, the inlets being provided on an upstream side of the first opening, wherein the plurality of inlets include a main inlet having a maximum opening area and at least one secondary inlet other than the main inlet, and the first opening is placed on a downstream side of the main inlet and the secondary inlet, a main inlet pipe connected to the main inlet;

a secondary inlet pipe connected to the secondary inlet; and a bypass air trunk communicating with the main inlet pipe through a main communication port provided in a wall portion of the main inlet pipe, the bypass air trunk communicating with the secondary inlet pipe through a secondary communication port, wherein at least two secondary inlets are provided, and wherein the plurality of secondary inlets are placed further on the upper side in the central axis direction of the swirl chamber closer to the downstream side in the swirl direction of the swirl chamber with reference to the main inlet.

9. An electric vacuum cleaner comprising:

a cyclone separation device according to claim 1; and a blower for generating a predetermined airflow in the cyclone separation device.

* * * * *